(12) United States Patent
De Laet et al.

(10) Patent No.: US 12,146,468 B2
(45) Date of Patent: Nov. 19, 2024

(54) ROTATIONAL DECOUPLING FOR ASSEMBLY AND DISASSEMBLY OF A GEARBOX-INTEGRATED MOUNTED GENERATOR ROTOR

(71) Applicant: ZF Friedrichshafen AG, Friedrichshafen (DE)

(72) Inventors: Wim De Laet, Antwerp (BE); Andy Maes, Sinaa (BE); Ralf Sperlich, Witten (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 12 days.

(21) Appl. No.: 17/810,350

(22) Filed: Jul. 1, 2022

(65) Prior Publication Data
US 2023/0014947 A1    Jan. 19, 2023

(30) Foreign Application Priority Data
Jul. 14, 2021    (DE) .................... 10 2021 207 462.6

(51) Int. Cl.
| | |
|---|---|
| *F03D 15/00* | (2016.01) |
| *F03D 80/70* | (2016.01) |
| *H02K 7/08* | (2006.01) |
| *H02K 7/116* | (2006.01) |
| *H02K 7/18* | (2006.01) |

(52) U.S. Cl.
CPC ............. *F03D 15/00* (2016.05); *F03D 80/70* (2016.05); *H02K 7/088* (2013.01); *H02K 7/116* (2013.01); *H02K 7/183* (2013.01); *F05D 2230/70* (2013.01)

(58) Field of Classification Search
CPC ......... F03D 15/00; F03D 80/70; H02K 7/088; H02K 7/116; H02K 7/183
See application file for complete search history.

(56) References Cited

U.S. PATENT DOCUMENTS

| | | |
|---|---|---|
| 2014/0125064 A1 | 5/2014 | Hofmann et al. |
| 2016/0091029 A1 | 3/2016 | Jansen et al. |
| 2021/0301793 A1* | 9/2021 | Kofman ................. F03D 80/50 |

FOREIGN PATENT DOCUMENTS

| | | |
|---|---|---|
| DE | 10311917 A1 | 10/2004 |
| EP | 2385247 B1 | 3/2019 |

OTHER PUBLICATIONS

Translation of DE 10311917 A1 (Year: 2004).*

* cited by examiner

*Primary Examiner* — Sean Gugger
(74) *Attorney, Agent, or Firm* — LEYDIG, VOIT & MAYER, LTD.

(57) ABSTRACT

An arrangement including a transmission and a generator is disclosed. The generator includes a generator rotor being non-rotatably connected to an output shaft of the transmission or configured to be connectable to the output shaft of the transmission. An assembly bearing that supports the generator rotor in the output shaft is also disclosed.

18 Claims, 3 Drawing Sheets

ROTATIONAL DECOUPLING FOR ASSEMBLY AND DISASSEMBLY OF A GEARBOX-INTEGRATED MOUNTED GENERATOR ROTOR

CROSS REFERENCE TO RELATED APPLICATIONS

This application claims benefit to German Patent Application No. DE 10 2021 207 462.6, filed on Jul. 14, 2021, which is hereby incorporated by reference herein.

BACKGROUND

The prior art has revealed wind power plants where the transmission and the generator are structurally integrated. Such a wind power plant is revealed for example in EP 2 385 247 B1. Wind power plants having a structural integration of transmission and generator are distinguished for example in that a generator rotor is supported by an output shaft of the transmission and shares one or more common bearings with the output shaft of the transmission.

So that in a wind power plant having a structural integration of transmission and generator, the generator can be made accessible for maintenance, the generator has to be decoupled from the output shaft. For this, the generator rotor and a wind rotor are firmly fastened to the housing. For corresponding fastening means to be mounted, the generator rotor and the wind rotor have in each case to be brought into a defined angular position.

SUMMARY

In an embodiment, the present disclosure provides an arrangement comprising a transmission and a generator with a generator rotor being non-rotatably connected or connectable to an output shaft of the transmission, wherein an assembly bearing supports the generator rotor in the output shaft.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
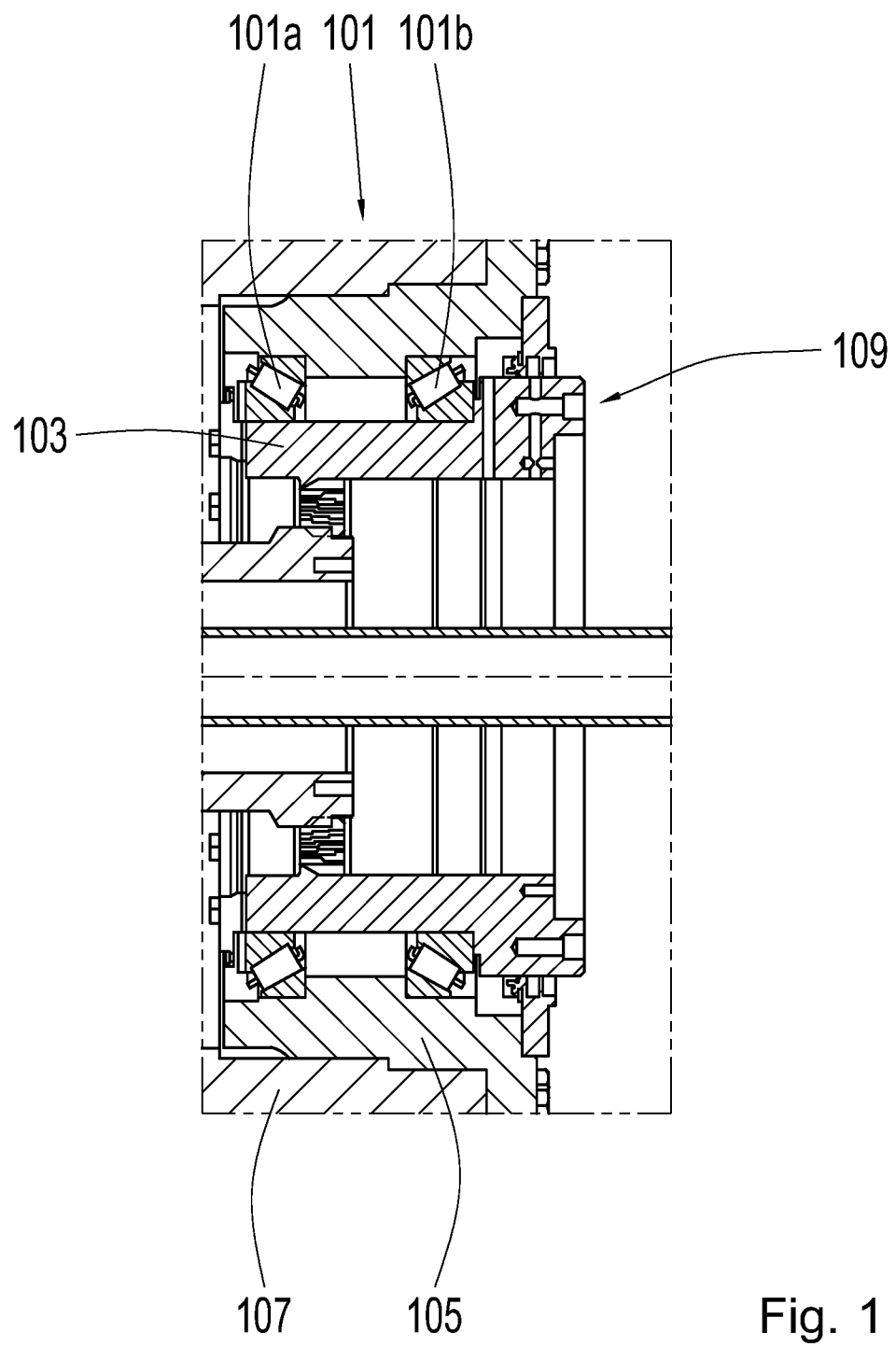
FIG. 1 shows a bearing arrangement for an integrated generator rotor.

In an embodiment, the present invention simplifies the maintenance of the drive train of a wind power plant. This is achieved by arrangements and methods as disclosed herein.

In an embodiment, the inventive arrangement comprises a transmission and a generator. The arrangement can in particular be part of the drive train of a wind power plant. In that case a wind rotor, i.e. a rotor facing the wind and being driven by the wind, is non-rotatably connected to an input shaft of the transmission.

A generator rotor, i.e. a rotor of the generator, is non-rotatably connected or connectable to an output shaft of the transmission. This implies that both the output shaft and the generator rotor are mounted rotatably. The non-rotatable connection of the generator rotor and the output shaft however does not allow any relative rotation of the generator rotor and the output shaft. Mechanical power acting on the output shaft is therefore transmitted to the generator rotor and converted by the generator into electrical power.

According to an embodiment of the invention, the arrangement exhibits an assembly bearing, i.e. a bearing that serves to assemble the arrangement and/or the abovementioned drive train. The assembly bearing supports the generator rotor in the output shaft. This means that the generator rotor is rotatably supported in the output shaft by means of the assembly bearing when the generator rotor is not connected to the output shaft in a non-rotatable manner.

The assembly bearing exhibits a first race and a second race. The first race and the second race correspond to each other. This means that the first race and the second race can be rotated relative to each other and mutually support each other. The first race and the second race in each case form at least one running surface. A bearing gap extends between the running surface of the first race and the running surface of the second race. In the case of a roller bearing, rolling elements are situated in the bearing gap that roll off on the running surface of the first race and the running surface of the second race. In the case of a journal bearing, the bearing gap is filled with a lubricant and/or air. The running surfaces of the first race and of the second race mutually support each other by means of the rolling elements, by means of the lubricant, or directly.

The first race is joined to the output shaft, the second race to the rotor. The first race and the output shaft can here be formed as separate pieces or be integrally connected to each other. The second race and the rotor can likewise be manufactured as separate pieces or mutually connected integrally.

The inventive support of the generator rotor in the output shaft allows the generator rotor to be rotated relative to the output shaft during maintenance, so that the generator rotor can be fastened in a maintenance position, i.e. in a specific position of the rotation angle. For this, the non-rotatable connection of the generator rotor and the output shaft has to be released.

During operation, the generator rotor is non-rotatably connected to the output shaft. To perform maintenance on a wind power plant that has been put into operation, using the inventive arrangement, in a preferred further development the generator rotor is releasably connected to the output shaft. The non-rotatable connection of the generator rotor to the output shaft has therefore been further developed releasably. For maintenance, the generator rotor can then be released from the output shaft and rotated relative to the output shaft using the inventive assembly bearing, so that it can be brought into the maintenance position.

The output shaft is preferably further developed using a first screw flange. According to the further development the generator rotor exhibits a second screw flange. The first screw flange and the second screw flange can be screwed to each other. This produces the non-rotatable connection described above between the generator rotor and the output shaft. The screw flanges permit simple release of this connection.

For the generator rotor to be freely rotated relative to the output shaft, in a preferred further development the generator rotor is supported axially displaceable in the output shaft. Specifically, the generator rotor can be axially displaceable when the non-rotatable connection between the generator rotor and the output shaft is released. Axial displaceability denotes a displaceability parallel to an axis of rotation of the generator rotor, of the output shaft, and of the assembly bearing.

The axially displaceable support of the generator rotor in the output shaft can be implemented in different ways. It is for example possible to further develop the assembly bearing to be axially displaceable. Then at least two mutually corresponding races of the assembly bearing can be axially displaced relative to each other.

The corresponding races are for example an inner race and an outer race of the assembly bearing. The inner race is at least partly arranged radially inside the outer race. This implies that the outer race is at least partly arranged radially outside the inner race. A plane that extends radially, i.e. orthogonally, relative to the abovementioned axis of rotation intersects both the inner race and the outer race.

The axially displaceable support of the generator rotor in the output shaft can additionally be implemented by an alignment gearing. This connects at least one race of the assembly bearing to the generator rotor or to the output shaft. The alignment gearing consists of two individual gearings that engage non-rotatably. The gearings can be displaced relative to each other in the axial direction. One of the gearings is presently joined in one piece or multiple pieces to the at least one race of the assembly bearing. The other gearing is joined in one or multiple pieces to the generator rotor or to the output shaft.

The generator and the transmission are preferably further developed at least partly integrated. This means that the output shaft and/or a bearing of the output shaft at least partly supports the weight of the generator rotor. The bearing of the output shaft is a bearing that supports a housing of the transmission or a component that is fastened to the housing.

The transmission and the generator are preferably fully integrated. Then the generator rotor has no bearing of its own with the result that the output shaft and/or the at least one bearing of the output shaft completely support the weight of the generator rotor.

The generator rotor is preferably further developed using an assembly locking. This is a means that can firmly fasten the generator rotor relative to the housing. The generator rotor can also be fastened by the assembly locking in a housing of the transmission or of the generator or a component that is fastened to the housing, i.e. in a component that is rigidly fastened in the housing of the transmission or of the generator. The assembly locking is applied when the transmission and the generator are partly or completely integrated. Since the weight of the generator rotor is then at least partly supported by the output shaft and/or the at least one bearing of the output shaft, the assembly locking is requisite for de-assembling the output shaft and/or the at least one bearing of the output shaft.

In an embodiment, the arrangement comprises the wind rotor mentioned at the outset.

The arrangement is preferably also further developed with an assembly locking for the wind rotor. It serves to fasten the wind rotor relative to the housing. The wind rotor can therefore be fastened using the assembly locking in the housing of the transmission or in a component that is fastened to the housing and that is rigidly fastened in the housing of the transmission.

In an embodiment, a inventive method according to the present invention serves to commission an arrangement further developed using an assembly locking for the generator rotor. The generator rotor is initially fastened firmly to the housing by the assembly locking. Using a further assembly locking, also the wind rotor can be fastened firmly to the housing.

For commissioning, the assembly locking of the generator rotor is released. The assembly bearing permits the generator rotor to be then rotated relative to the output shaft. Rotation relative to the output shaft then brings the generator rotor into a position of the rotation angle in which it can be connected non-rotatably to the output shaft. If, for example, the output shaft and the generator rotor are further developed using screw flanges, the generator rotor is rotated such that the screw holes of the two screw flanges are aligned with each other and the screws can be inserted.

When present, also the assembly locking of the wind rotor is released again. This preferably takes place after the generator rotor was non-rotatably connected to the output shaft.

Since the assembly bearing is not required during operation and is without any function, it is disassembled again in a preferred further development of the method. According to the further development the assembly bearing is therefore removed from the arrangement. This preferably takes place after the generator rotor was non-rotatably connected to the output shaft.

In an embodiment, a further inventive method serves for the maintenance of the arrangement further developed with the assembly locking for the generator. The method envisages putting the arrangement out of operation by releasing the non-rotatable connection of the generator rotor to the output shaft and to rotate the generator rotor relative to the output shaft into a maintenance position. The generator rotor being in the maintenance position, it is fastened to the housing by the assembly locking. This preferably takes place prior to the non-rotatable connection of the generator rotor to the output shaft being released.

In an embodiment, a further development of the method envisages for the assembly bearing to be installed in the arrangement—preferably before releasing the non-rotatable connection of the generator rotor to the output shaft.

In some embodiments, further developments of in each case one of the inventive methods, the generator rotor is axially shifted. In detail, it is axially shifted away from the output shaft if it is to be brought from the operating position into the maintenance position. This takes place after the non-rotatable connection of the generator rotor to the output shaft was released.

If conversely the generator rotor is to be brought from the maintenance position into the operating position, it is displaced axially in the direction of the output shaft. This takes place prior to the generator rotor being non-rotatably connected to the output shaft.

Preferred exemplary embodiments of the invention are illustrated in the figures. Matching reference numbers here specify identical or functionally identical features.

The bearing arrangement 101 illustrated in FIG. 1 comprises two tapered-roller bearings 101a, 101b in an O arrangement. An output shaft 103 of a wind turbine transmission is rotatably supported in a housing insert 105 by the bearing arrangement 101.

The housing insert 105 is screwed to the wall of a transmission housing 107. Release of this screw connection permits the housing insert 105 to be removed together with the bearing arrangement 101 and the output shaft 103 for maintenance purposes.

The output shaft 103 forms a screw flange 109 for receiving a generator rotor. For removing the housing insert 105 together with the bearing arrangement 101 and the output shaft 103, the generator rotor has to be brought into a maintenance position. This requires the suitable rotation of the generator rotor.

Figure 2:
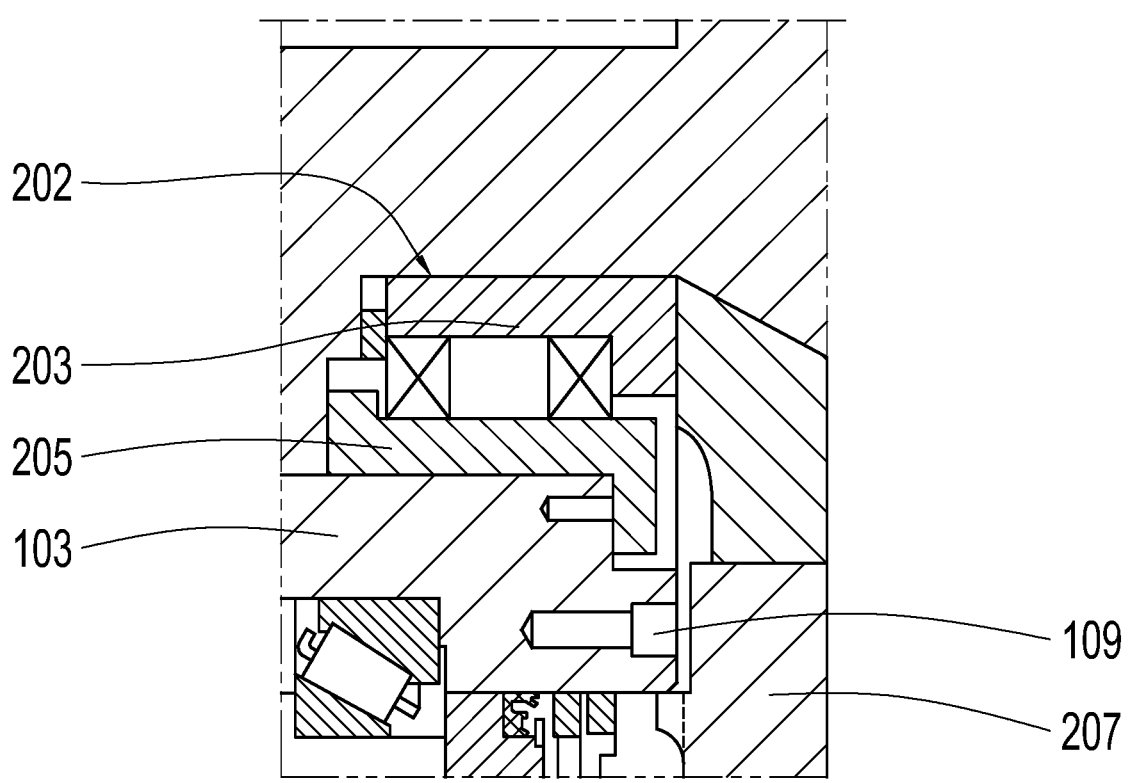
FIG. 2 shows an assembly bearing.

For the generator rotor to be rotated independently of the output shaft 103, an assembly bearing 201 illustrated in FIG. 2 is provided. The assembly bearing 201 exhibits an inner ring 203 and an outer ring 205. The outer ring 205 is joined to the output shaft 103 that has been designed as a hollow shaft, the inner ring 205 to the generator rotor 207 illustrated in FIG. 2.

By releasing the screw connection between the generator rotor 207 and the output shaft 103, the generator rotor 207 can be rotated relative to the output shaft 103. Here, the generator rotor 207 is supported in the output shaft 103 via the assembly bearing 201.

The inner ring 203 and the outer ring 205 can be axially displaced relatively to each other. Therefore, the generator rotor 205 as well can be displaced relative to the output shaft 103. As a result, the generator rotor 207 can be rotated freely during assembly.

Figure 3:
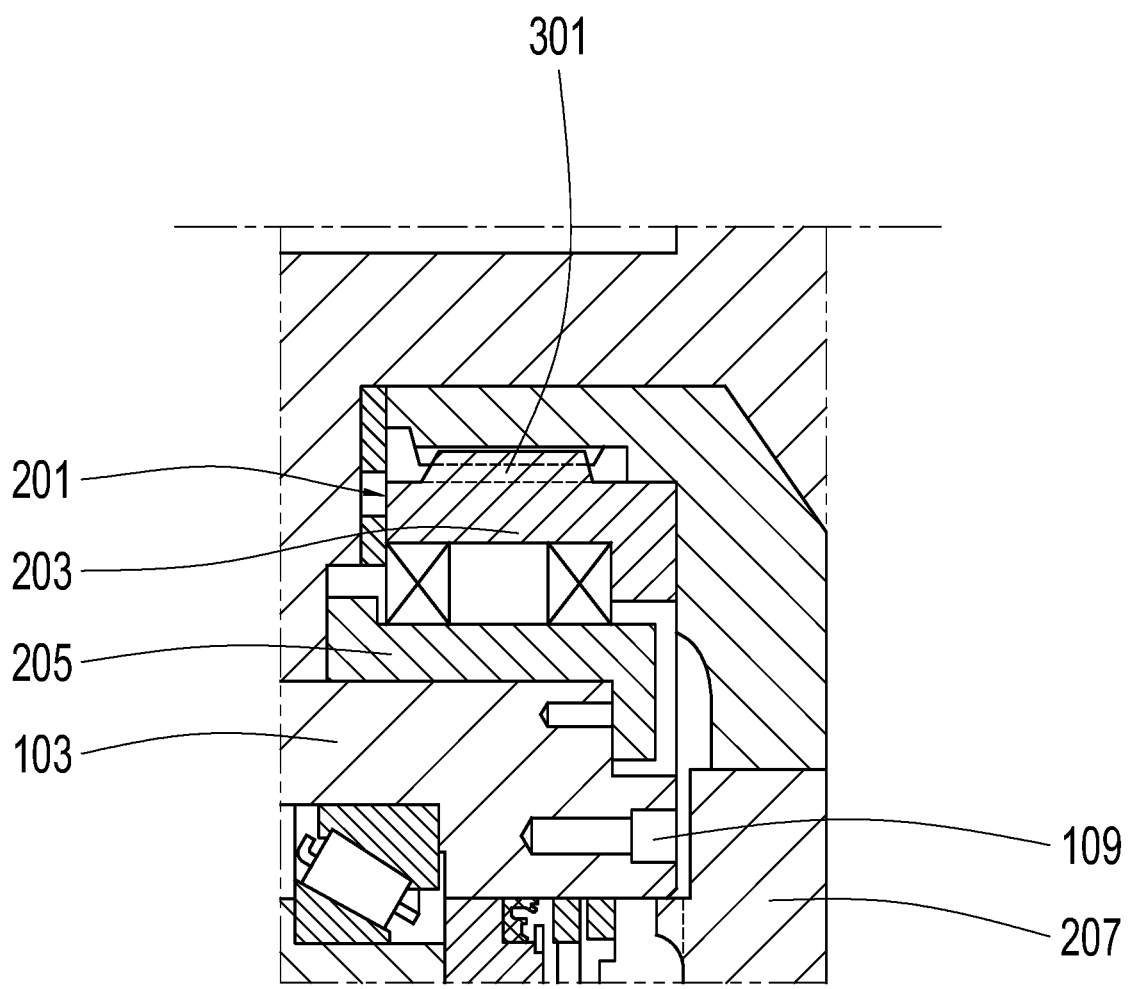
FIG. 3 shows an assembly bearing having alignment gearing.

FIG. 3 shows an alignment gearing 301. The alignment gearing 301 connects the inner ring 203 of the bearing arrangement 201 to the generator rotor 207. As a result, the generator rotor 207 can be displaced axially relative to the inner ring 203 in the alignment gearing 301.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE CHARACTERS

101 Bearing arrangement
101a Tapered-roller bearing
101b Tapered-roller bearing
103 Output shaft
105 Housing insert
107 Transmission housing
109 Screw flange
201 Assembly bearing
203 Inner ring
205 Outer ring
207 Generator rotor
301 Alignment gearing

The invention claimed is:

1. A transmission comprising:
an output shaft with a shaft screw flange at an axial end;
a generator rotor with a rotor screw flange,
wherein the rotor screw flange and the shaft screw flange are configured to be joined by a screw connection to form a non-rotatable connection between the output shaft and the generator rotor, and
wherein the generator rotor extends radially inward from the rotor screw flange and extends axially into a radial interior of the output shaft.

2. The transmission according to claim 1, wherein the generator rotor is releasably connected to the output shaft by the screw connection.

3. The transmission according to claim 1, wherein the screw connection is a bolt that bolts the shaft screw flange to the rotor screw flange.

4. The transmission according to claim 1, wherein the generator rotor is axially and displaceably supported in the output shaft.

5. The transmission according to claim 1, further comprising an inner race and an outer race,
wherein the inner race is arranged radially inside the outer race,
wherein the outer race is joined to the output shaft, and
wherein the inner race is joined to the generator rotor.

6. The transmission according to claim 1, wherein the output shaft or at least one bearing of the output shaft at least partly supports a weight of the generator rotor.

7. The transmission according to claim 1, comprising a housing screw connection for the generator rotor, wherein the generator rotor is configured to be fastenable to a housing by the housing screw connection.

8. The transmission according to claim 1, comprising an input shaft and a wind rotor that is non-rotatably connected to the input shaft.

9. The transmission according to claim 8, comprising a wind rotor screw connection for the wind rotor, wherein the wind rotor is configured to be fastenable to a housing by the wind rotor screw connection.

10. A method for assembling an arrangement comprising a transmission, a generator with a generator rotor configured to be non-rotatably connectable to an output shaft of the transmission, wherein an assembly bearing supports the generator rotor at least partially inside of a radial interior of the output shaft, and a screw connection for the generator rotor, wherein the generator rotor is configured to be fastenable to a housing by the screw connection, the method comprising:
releasing the assembly bearing of the generator rotor;
rotating the generator rotor relative to the output shaft; and
non-rotatably connecting the generator rotor to the output shaft by a rotor screw flange, wherein the generator rotor extends radially inward from the rotor screw flange and extends axially into the radial interior of the output shaft.

11. The method according to claim 10, comprising removing the assembly bearing.

12. A method for disassembling an arrangement comprising a transmission, a generator with a generator rotor configured to be non-rotatably connectable to an output shaft of the transmission, wherein an assembly bearing supports the generator rotor at least partially inside of a radial interior of the output shaft, and a screw connection for the generator rotor, wherein the generator rotor is configured to be fastenable to a housing by the screw connection, the method comprising:
 releasing a non-rotatable connection of the generator rotor to the output shaft by a rotor screw flange, wherein the generator rotor extends radially inward from the rotor screw flange and extends axially into the radial interior of the output shaft;
 rotating the generator rotor relative to the output shaft; and
 fastening the generator rotor to the housing via the screw connection.

13. The method according to claim 12, comprising installing the assembly bearing.

14. The method according to claim 12, comprising axially displacing the generator rotor from within the radial interior of the output shaft.

15. The transmission according to claim 5, wherein the inner race and the outer race are configured to be axially displaced relative to one another.

16. The transmission according to claim 5, wherein the inner race and the generator rotor are joined by an alignment gearing.

17. The transmission according to claim 16, wherein the generator rotor is configured to be axially displaced from within the radial interior of the output shaft to an outside of the radial interior of the output shaft when the screw connection is released.

18. The transmission according to claim 1, wherein the generator rotor is configured to be axially fixed by the screw connection.

* * * * *